United States Patent Office 2,762,847
Patented Sept. 11, 1956

2,762,847

MANUFACTURE OF ALCOHOLS BY GUERBET CONDENSATION

Robert E. Miller and George E. Bennett, Dayton, Ohio, assignors to Monsanto Chemical Company, St. Louis, Mo., a corporation of Delaware No Drawing. Application May 5, 1953,
Serial No. 353,233

16 Claims. (Cl. 260—642)

This invention relates to the formation of alcohols from alcohols of lower molecular weight. In a particular aspect the invention pertains to new catalysts or condensing agents for the Guerbet reaction.

The Guerbet reaction is well-known to the organic chemist. According to the Guerbet reaction a primary or secondary alcohol which contains a methylene group attached to the carbon atom of the carbinol group is condensed with itself (or with another alcohol of the class just described) to form as the principal product a higher alcohol containing double the number of carbon atoms of the starting alcohol, for example, n-butanol is condensed to 2-ethylhexanol. Similarly, a mixture of n-butanol and ethanol can react to form 2-ethylhexanol (by condensation of two molecules of n-butanol), n-butanol (by condensation of two molecules of ethanol), n-hexanol and 2-ethylbutanol (by condensation of a molecule of n-butanol with a molecule of ethanol). It is also apparent that a certain amount of condensation will occur between the principal higher alcohol product and unreacted starting alcohol, as well as between two molecules of the principal higher alcohol product, and on up the line, forming a series of higher molecular weight alcohols by condensation which theoretically can involve any two molecules present in the reaction mixture at a given time, if at least one of the two materials undergoing condensation contains a methylene group attached to the carbon atom of the carbinol group. As a practical matter, the quantity of alcohols higher than the principal higher alcohol product is comparatively small.

The classical catalyst for the Guerbet reaction is sodium metal employed in the form of its alcoholate. It is known that the condensation occurs with liberation of hydrogen. However, the theories advanced as to the particular mechanism of the Guerbet reaction, starting from the time of Guerbet's first work prior to 1900 on up to the present day, are many and there is far from general agreement as to what reaction or reactions actually occur during the transformation of an alcohol of the type described to a higher alcohol. It does seem apparent, however, that a plurality of reactions is involved, so that the process is particularly sensitive and not predictable as to the effect of a given catalytic material inasmuch as the postulated reactions are of varying types. It is perhaps for these reasons that the reaction has been of great theoretical as well as practical interest to chemists who have investigated all phases thereof with numerous catalysts, reactants and reaction conditions. In addition to the higher alcohols formed by condensation of two molecules of alcohols present in the reaction mixture, side reactions result in the formation of other materials, principal of which are carboxylic acids (or salts thereof) and esters of carboxylic acids. Of course, it is ordinarily desirable to minimize formation of these by-products.

An object of this invention is to provide new catalysts for the Guerbet reaction. Another object is to effect the condensation of primary and secondary alcohols which contain a methylene group attached to the carbon atom of the carbinol group resulting in formation of higher alcohols. A further object is to increase the yield of the principal higher alcohol formed by direct condensation of a starting alcohol of the type described. Another object is to minimize formation of by-product acids and esters in the Guerbet reaction. Yet another object is to provide catalysts for the Guerbet reaction which can be used in relatively small amounts. Another object is to effect the Guerbet reaction without the use of added alkali metal or alkali metal hydroxide. Further objects and advantages of the invention will be apparent to one skilled in the art from the accompanying disclosure and discussion.

In accordance with the present invention the Guerbet reaction is effected in the presence of added catalytic amounts of phosphates having in 1 per cent aqueous solution a pH greater than 9. The phosphates employed as catalysts can be those of the alkali metals and the alkaline earth metals, preferably the former, provided the pH is as designated. Particularly preferred are the ortho and pyrophosphates. From the viewpoint of effectiveness and availability, the phosphates of potassium are preferred. Sodium phosphates meeting the stated requirements are also valuable. In general, the more electropositive the alkaline earth metal or the alkali metal, the more effective a given quantity of catalyst, e. g., a cesium phosphate is better than the corresponding phosphate of sodium. However, for the reasons indicated, the phosphates of potassium and sodium are usually the preferred catalysts of the present invention. By way of example of phosphates that can be used as catalyst for the Guerbet reaction in the practice of the invention and which are preferred, there can be mentioned the following: $K_3PO_4$, $K_2HPO_4$, $Na_3PO_4$, $Ca_3(PO_4)_2$, $K_4P_2O_7$, $Na_4P_2O_7$. Polyphosphates and metaphosphates in general are too acidic to act as catalysts in the Guerbet reaction.

By use of the type of phosphates described, we have obtained excellent results in carrying out the Guerbet reaction with a variety of alcohols. Extent of conversion is high for this reaction, and the ultimate yields are very good. Formation of acid and ester by-products is very low.

Any catalytically effective amount of the chosen phosphate catalyst can be used, such as from 0.01 to 0.3 mole per mole of alcohol, but preferably the amount is within the range of 0.05 to 0.25 mole catalyst per mole of alcohol charged to the reaction. Optimum quantity of catalyst to be used will be dependent to some extent upon the particular catalyst chosen, the particular alcohol or mixture of alcohol to be condensed, and the temperature and time conditions of reaction, as well as other reaction variables as will be understood by those skilled in the art.

It is often desirable to employ additionally a dehydrogenation catalyst, preferably one of the known metal dehydrogenation catalysts, for example, copper, nickel, or copper chromite, or mixtures thereof. When an added dehydrogenation catalyst is employed, suitable amounts are from 1 to 5 per cent based on the weight of alcohol charged.

The optimum temperature to be used will vary with the alcohol charged, but is usually in the neighborhood of the critical temperature of the particular alcohol. By way of example, the critical temperature of n-butanol is 287° C. and we have obtained excellent results in condensing n-butanol in accordance with this invention at about 290–300° C. As a general rule it can be stated that the reaction can be effected at a temperature within the range of from 50° C. below the critical temperature of the alcohol to 50° C. above the critical temperature of the alcohol, the temperature used within this range, however, being chosen to give economical reaction rate on the one hand without undue decomposition and side reactions on the other hand. In some instances temperatures outside this range can be employed, and those skilled in the art, having been given the benefit of the present disclosure, will readily choose a suitable temperature for a particular combination of alcohol, catalyst, and other reaction conditions.

A suitable time of reaction for a batch process is in the neighborhood of from 4 to 10 hours, but in most instances 4 to 5 hours is sufficient and often a considerable increase in time over 4 to 5 hours may actually lower the yield of desired product. Ordinarily the reaction time required for a continuous flow-type of reaction system is considerably less than that required for a batch reaction. In a given instance a time of reaction will be chosen to provide a satisfactory economic balance between high conversion of starting alcohol to products other than the starting alcohol, and high ultimate yield of desired higher alcohol, i. e., a high proportion of the starting alcohol being converted to the desired higher alcohol product.

The process is commonly effected under pressure, but sometimes this is not necessary, provided temperature and reaction times are properly selected to give significant extent of reaction at atmospheric pressure. For some alcohols the boiling temperature at atmospheric pressure is not sufficiently high to give an adequate rate of reaction. However, the process is usually best effected under pressure and the autogenous pressure of the reaction mixture is quite suitable. If desired, the pressure can be increased above this value by the inclusion of added gas, such as an inert gas, i. e., nitrogen, or even an active gas, such as hydrogen.

It is preferred to effect the reaction under conditions causing removal of water from the reaction system as the water is formed during the reaction. Such removal of water is generally beneficial for high conversions and yields. One very effective method of obtaining such water removal is by subjecting the reaction mixture to azeotropic distillation while the reaction proceeds, and trapping out water thus removed from the reaction mixture while returning other components to the reaction mixture. Such azeotropic distillation can be effected either in the presence or absence of added materials, for example, benzene or other inert hydrocarbon aiding the distillation of water from the reaction mixture. The choice as to whether or not to use such an added material will be dependent upon the particular alcohol employed and the characteristics of the vapor-liquid equilibria for a given system. Alternatively, a chemical agent can be present in the reaction mixture to remove liberated water; a metal oxide stable under the reaction conditions, for example, calcium oxide or magnesium oxide, can be employed satisfactorily, either of these oxides combining with liberated water as rapidly as formed by the reaction.

Since the Guerbet reaction is so well-known to organic chemists, it is not deemed necessary to recite in great detail the numerous alcohols which can be employed alone or in admixture with each other as the starting materials for the practice of the present invention. As pointed out above, the invention is broadly applicable to primary or secondary alcohols which contain a methylene group attached to the carbon atom which bears the hydroxyl group. Within this general definition the skilled chemist is fully aware of a very large number of alcohols which can be used. The alcohol can be solely aliphatic or can obtain an aromatic group. Alicyclic alcohols meeting the stated requirements are also applicable. Although the invention is usually applied to alcohols containing only carbon and hydrogen other than the oxygen of the hydroxyl group, it can also be applied to alcohols coming within the general definition set forth hereinabove which further contain non-hydrocarbon groups that do not prevent the desired condensation from occurring.

The invention can be applied to an alcohol having an olefinic double bond although that bond may in some instances enter into reaction to some extent. The term "methylene group" as used herein is inclusive of "methyl groups," which is a methylene group (—CH$_2$—) having one of the two valences satisfied by hydrogen (the other valence being attached to the carbon atom of the carbinol group). The invention is applicable to alcohols ranging from ethanol on upward without any particular limit in number of carbon atoms being encountered other than that of reasonable thermal stability at the reaction conditions. Thus, a primary or secondary alcohol containing a methylene group attached to the carbinol group and having 20 carbon atoms in the molecule can be condensed with itself or with other alcohols within the general definition. Ordinarily, however, the invention is most desirably applied to alcohols containing from 2 to 10 carbon atoms per molecule. Merely by way of example, in view of the notoriety of this reaction, there can be mentioned the following suitable reactants: ethanol, n-butanol, n-hexanol, n-octanol, propanol, i-propanol, octanol-2, 4-methyl-pentanol-2, β-phenylethanol, cyclohexanol. Two of these can be reacted with each other, for example, i-butanol and n-butanol, n-butanol with ethanol. Further, the following will react with a second alcohol which contains the

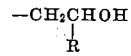

grouping (where R equals hydrogen, alkyl or aryl), but not with themselves, to form higher alcohols: i-butanol, benzyl alcohol, 2-ethylhexanol, 2-ethylbutanol, cinnamyl alcohol, p-methoxybenzyl alcohol.

The following examples are submitted to illustrate some of the preferred embodiments of our invention. It will be understood, however, that the specific materials and details of operation set forth therein are given by way of example:

*Example 1*

A mixture of 214.0 grams (2.0 moles) of n-hexanol and 53.0 grams (0.25 mole) of tripotassium phosphate was refluxed at 158–160° C. under atmospheric pressure until 7.0 cc. of water of reaction had been formed and removed by trapping out from the reflux liquid being returned to the reaction flask. Then 8.0 grams of a nickel:copper dehydrogenation catalyst containing nickel and copper in a 44:56 weight ratio was added to the reaction mixture, and the reaction continued for a period of 23 hours. Water formed during the reaction was trapped out as rapidly as it was formed, 21.5 cc. of water being thus removed. The reaction mixture was filtered and then fractionated. 2-butyl-octanol product in the amount of 88.8 grams was obtained, boiling point 106–108° C./3 mm. Hg, $d_4^{20}$=0.891. This is a conversion of 45.5 per cent of that theoretically possible if all of the n-hexanol charged were converted to 2-butyloctanol. (Conversions reported herein are all on this basis of per cent of theory.) The amount of high boiling residue, which included alcohols higher than those containing 12 carbon atoms per molecule, and esters, was 57.7 grams. The acid content amounted to 3.1 grams. Uncharged n-hexanol recovered by distillation can be recharged to a continuous process or subjected to the same reaction in a separate batch.

*Example 2*

Under conditions generally similar to those cited in Example 1, except that the total reflux time was only 10 hours, 214.0 grams of n-hexanol, 53.5 grams tripotassium phosphate, 8.0 grams of copper dehydrogenation catalyst, and 5.0 grams of Norit (decolorizing activated bone charcoal) were refluxed at 157–168° C. and atmospheric pressure. The water being removed as rapidly as formed in the reaction amounted to 14.8 cc. The resultant liquid was filtered from the solids and then fractionated, yielding 56.6 grams of 2-butyloctanol and 20.0 grams of higher boiling material. The recovery of unreacted n-hexanol was 129.5 grams. The conversion to higher alcohol was 28.9 per cent of theory, with a yield of 66.8 per cent of theory.

Example 3

A mixture of 444.0 grams of n-butanol (6.0 moles), 53.5 grams tripotassium phosphate and 20.0 grams of copper dehydrogenation catalyst was placed in a steel autoclave which was then sealed and heated to 290° C. for 5 hours with agitation by stirring. At the end of this time, the autoclave was opened, the solids removed by filtration, and the organic material distilled.

2-ethylhexanol was obtained in the amount of 94.0 grams, representing a conversion of 24.1 per cent of theory. Higher boiling material amounted to 20.0 grams.

Example 4

An autoclave was charged with 444.0 grams (6.0 moles) of n-butanol, 53.0 grams (0.25 mole) of tripotassium phosphate, 56.0 grams (1.0 mole) of calcium oxide and 20.0 grams of copper dehydrogenation catalyst. The reaction mixture was heated at 290° C. for 5 hours with agitation by stirring. The mixture was then filtered, and distilled, yielding 156.0 grams of 2-ethylhexanol (1.19 moles) and 22.5 grams of higher boiling material. Unreacted butanol amounting to 226.5 grams was recovered. The conversion of n-butanol to 2-ethylhexanol was 40.0 per cent of theory, with the yield amounting to 81.6 per cent of theory.

Example 5

Under conditions similar to those cited in Example 4, 444.0 grams of n-butanol (6.0 moles), 80.0 grams (0.37 mole) of tripotassium phosphate, 28.0 grams (0.5 mole) of calcium oxide, and 20.0 grams of copper dehydrogenation catalyst were heated to 290° C. for 5 hours. Upon cooling the mixture was filtered and the organic material was distilled. 2-ethylhexanol was obtained in the amount of 150.0 grams (1.15 moles), which is a conversion of 38.4 per cent of theory. High boiling material amounted to 22.5 grams. Recovered unreacted butanol was 251.5 grams.

Example 6

A stirred autoclave was charged with 6 moles n-butanol, 0.25 mole tetrapotassium pyrophosphate ($K_4P_2O_7$) and 0.5 mole calcium oxide. The reaction mixture was maintained at 290° C. for 5 hours.

The resulting material was worked up as described in the preceding examples, resulting in a recovery of 50.0 grams 2-ethylhexanol product, which is a conversion of 12.8 per cent of theory. Higher boiling material amounted to 16.5 grams.

Example 7

A stirred autoclave was charged with 6 moles n-butanol, 0.25 mole dipotassium orthophosphate ($K_2HPO_4$), and 0.5 mole calcium oxide. The reaction mixture was maintained at 290° C. for 5 hours.

As a result of the reaction there was obtained 92.0 grams (0.72 mole) of 2-ethylhexanol product which is a conversion of 23.6 per cent of theory. Higher boiling materials amounted to 18.5 grams.

Example 8

A stirred reaction flask equipped with reflux condenser was charged with 303.0 grams (3.0 moles) cyclohexanol, and 0.25 mole $K_3PO_4$ catalyst. The reaction mixture was refluxed for 10 hours at a reflux temperature ranging from 160 to 201° C. Water was trapped out continuously from the returning reflux, a total of 32.4 ml. water being thus removed.

On working up the reaction mixture, 154.5 grams of 2-cyclohexyl-1-cyclohexanol product was recovered, B. P. 116–118° C. at 3 mm. Hg; $n_D^{25.5}=1.5037\text{--}8$; $d_4^{20}=0.975$. This represents a conversion of 56.5 per cent of theory. Also recovered was 40 grams of solid by-product, presumably impure dicyclohexyl-1-cyclohexanol.

Example 9

The condensation of n-butanol (6.3 moles) was attempted using 0.5 mole calcium oxide and 0.25 mole of potassium tripolyphosphate ($K_5P_3O_{10}$). The pH of a one per cent aqueous solution of this potassium tripolyphosphate was 8.5–8.8. The reaction mixture was maintained at 290° C. for five hours. No condensation of the charged alcohol was evident.

Example 10

A run similar to Example 5 was made utilizing 6.0 moles of n-butanol, with the exception that no phosphate catalyst was present but only calcium oxide in the amount of 0.5 mole. The temperature was maintained at 290° C. for 5 hours. No condensation of the starting alcohol occurred.

While the invention has been described with particular references to various preferred embodiments thereof, it will be appreciated that numerous modifications and variations are possible without departing from the invention.

We claim:

1. In the Guerbet condensation of alcohols, the improvement which comprises employing as catalyst an alkali metal phosphate having in 1 per cent aqueous solution a pH greater than 9.

2. In the Guerbet condensation of alcohols, the improvement which comprises employing as catalyst a phosphate selected from the group consisting of those alkali metal orthophosphates and pyrophosphates having in 1 per cent aqueous solution a pH greater than 9.

3. A process which comprises condensing an alcohol selected from the group consisting of primary and secondary alcohols which have a methylene group attached to the carbon atom of the carbinol group in the presence of small but catalytic amounts of an alkali metal phosphate having in 1 per cent aqueous solution a pH greater than 9.

4. A process which comprises condensing an alcohol selected from the group consisting of primary and secondary alcohols which have a methylene group attached to the carbon atom of the carbinol group to form an alcohol containing double the number of carbon atoms in the said first-named alcohol, at a temperature within the range of from 50° C. below to 50° C. above the critical temperature of said first-named alcohol and at the autogenous pressure of the reaction mixture, in the presence of an alkali metal phosphate having in 1 per cent aqueous solution a pH greater than 9, in an amount within the range of from 0.05 to 0.25 mole of phosphate per mole of said first-named alcohol.

5. In the Guerbet condensaton of alcohols, the improvement which comprises employing as catalyst tripotassium orthophosphate.

6. In the Guerbet condensation of alcohols, the improvement which comprises employing as catalyst dipotassium hydrogen orthophosphate.

7. In the Guerbet condensation of alcohols, the improvement which comprises employing as catalyst trisodium orthophosphate.

8. In the Guerbet condensation of alcohols, the improvement which comprises employing as catalyst tetrapotassium pyrophosphate.

9. In the Guerbet condensation of alcohols, the improvement which comprises employing as catalyst tetrasodium pyrophosphate.

10. A process which comprises condensing an alcohol selected from the group consisting of primary and secondary alcohols which have a methylene group attached to the carbon atom of the carbinol group in the presence of small but catalytic amounts of an alkali metal phosphate having in 1 per cent aqueous solution a pH greater than 9, while removing water from the reaction mixture as rapidly as formed.

11. A process according to claim 10 wherein said water removal is effected by distillation.

12. A process according to claim 10 wherein said water removal is effected by the presence of a water absorptive metal oxide in the reaction mixture.

13. In the Guerbet condensation of alcohols, the improvement which comprises employing as catalyst an alkali metal phosphate having in 1 percent aqueous solution a pH greater than 9 and a dehydrogenation catalyst.

14. A process according to claim 3 wherein there is also present in the reaction mixture a metallic dehydrogenation catalyst.

15. A process which comprises condensing n-butanol to form 2-ethylhexanol at a temperature within the range of from 50° C. below to 50° C. above the critical temperature of n-butanol and at the autogenous pressure of the reaction mixture, in the presence of an alkali metal phosphate having in 1 percent aqueous solution a pH greater than 9, in an amount within the range of from 0.05 to 0.25 mole of phosphate per mole of n-butanol and from 1 to 5 weight per cent, based on the charged n-butanol, of a metallic dehydrogenation catalyst, while removing water from the reaction mixture as rapidly as formed.

16. A process which comprises condensing n-hexanol to form 2-butyloctanol at a temperature within the range of from 50° C. below to 50° C. above the critical temperature of n-hexanol and at the autogenous pressure of the reaction mixture, in the presence of an alkali metal phosphate having in 1 percent aqueous solution a pH greater than 9, in an amount within the range of from 0.05 to 0.25 mole of phosphate per mole of n-hexanol and from 1 to 5 weight percent, based on the charged n-hexanol, of a metallic dehydrogenation catalyst, while removing water from the reaction mixture as rapidly as formed.

References Cited in the file of this patent

UNITED STATES PATENTS 2,092,449 Fuchs et al. _____ Sept. 7, 1937

OTHER REFERENCES

Burgoyne et al.: J. A. C. S., vol. 74, pgs. 5592–5, Nov. 1952.